US012769787B1

(12) United States Patent
Kumar et al.

(10) Patent No.: US 12,769,787 B1
(45) Date of Patent: Oct. 20, 2026

(54) AUTONOMOUS METADATA HARMONIZATION IN MULTI-CLOUD ENVIRONMENTS

(71) Applicant: Dell Products L.P., Round Rock, TX (US)

(72) Inventors: Avinash Kumar, Patna (IN); Zijia Wang, London (GB); Srinath Kappgal, Cork (IE)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 19/333,834

(22) Filed: Sep. 19, 2025

(51) Int. Cl.
*G06F 16/81* (2019.01)

(52) U.S. Cl.
CPC .................................... *G06F 16/81* (2019.01)

(58) Field of Classification Search
None
See application file for complete search history.

(56) References Cited

U.S. PATENT DOCUMENTS

2023/0177378 A1* 6/2023 Hassan .................. G06N 20/00
706/12
2024/0012680 A1* 1/2024 Wang ........................ G06F 8/71
2025/0363202 A1* 11/2025 Vintila .................... G06F 21/53

* cited by examiner

*Primary Examiner* — Eddy Cheung
(74) *Attorney, Agent, or Firm* — Amin, Turocy & Watson, LLP

(57) ABSTRACT

Autonomous metadata harmonization in multi-cloud environments (e.g., using a computerized tool), is enabled. For example, a corresponding process can comprise validating, using a local artificial intelligence model that was trained using federated learning applied to a group of zones of a multi-cloud architecture, a metadata attribute in a zone of the group of zones of the multi-cloud architecture, in response to determining a deviation in the metadata attribute, determining a trust score, applicable to the metadata attribute, using a defined probabilistic model, in response to the trust score being determined to satisfy a defined trust threshold, queuing a metadata update applicable to the metadata attribute, using a defined weighted priority process, determining a priority order for the metadata update among a group of metadata updates applicable to the group of zones of the multi-cloud architecture, and based on the priority order, initiating the metadata update.

20 Claims, 10 Drawing Sheets

300

| Cloud Zone | Reported CPU (%) | Actual CPU (%) | Deviation | Trigger Action |
|---|---|---|---|---|
| Zone A | 60 | 80 | +20% | Initiate scale-up |
| Zone B | 50 | 48 | -2% | No action |
| Zone C | 70 | 90 | +20% | Send correction alert |

FIG. 3

400

| Workload Type | Existing Keys | New Keys Injected |
| --- | --- | --- |
| Normal Batch | CPU, Memory, BackupID | None |
| Real-Time Stream | CPU, Memory | *jitter_tolerance_ms* |
| Emergency | CPU, Memory | *priority_level, latency_sla_ms* |

FIG. 4

500

| Zone | Local Anomaly Detected | Action Taken Locally | Sync to Global Model |
|---|---|---|---|
| Zone A | Packet Loss > 10% | Adjust retransmit window | Yes |
| Zone B | Jitter Spike | Increase buffer size | Yes |
| Zone C | No anomaly | No action | Yes |

FIG. 5

AUTONOMOUS METADATA HARMONIZATION IN MULTI-CLOUD ENVIRONMENTS

BACKGROUND

Metadata inconsistency is a major bottleneck to ensuring smooth and timely workload orchestration. Because conventional orchestration engines rely on current metadata to make real-time decisions regarding resource allocation, policy enforcement, and scaling actions, even minor inconsistencies can trigger incorrect prioritization of workloads.

The above-described background relating to metadata inconsistency is merely intended to provide a contextual overview of some current issues and is not intended to be exhaustive. Other contextual information may become further apparent upon review of the following detailed description.

BRIEF DESCRIPTION OF DRAWINGS

FIG. 3 shows an example table associated with metadata drift detection in accordance with one or more example embodiments described herein.

FIG. 4 shows an example table associated with dynamic schema extension in accordance with one or more example embodiments described herein FIG. 5 shows an example table associated with autonomous metadata harmonization in multi-cloud environments in accordance with one or more example embodiments described herein.

DETAILED DESCRIPTION

Figure 1:
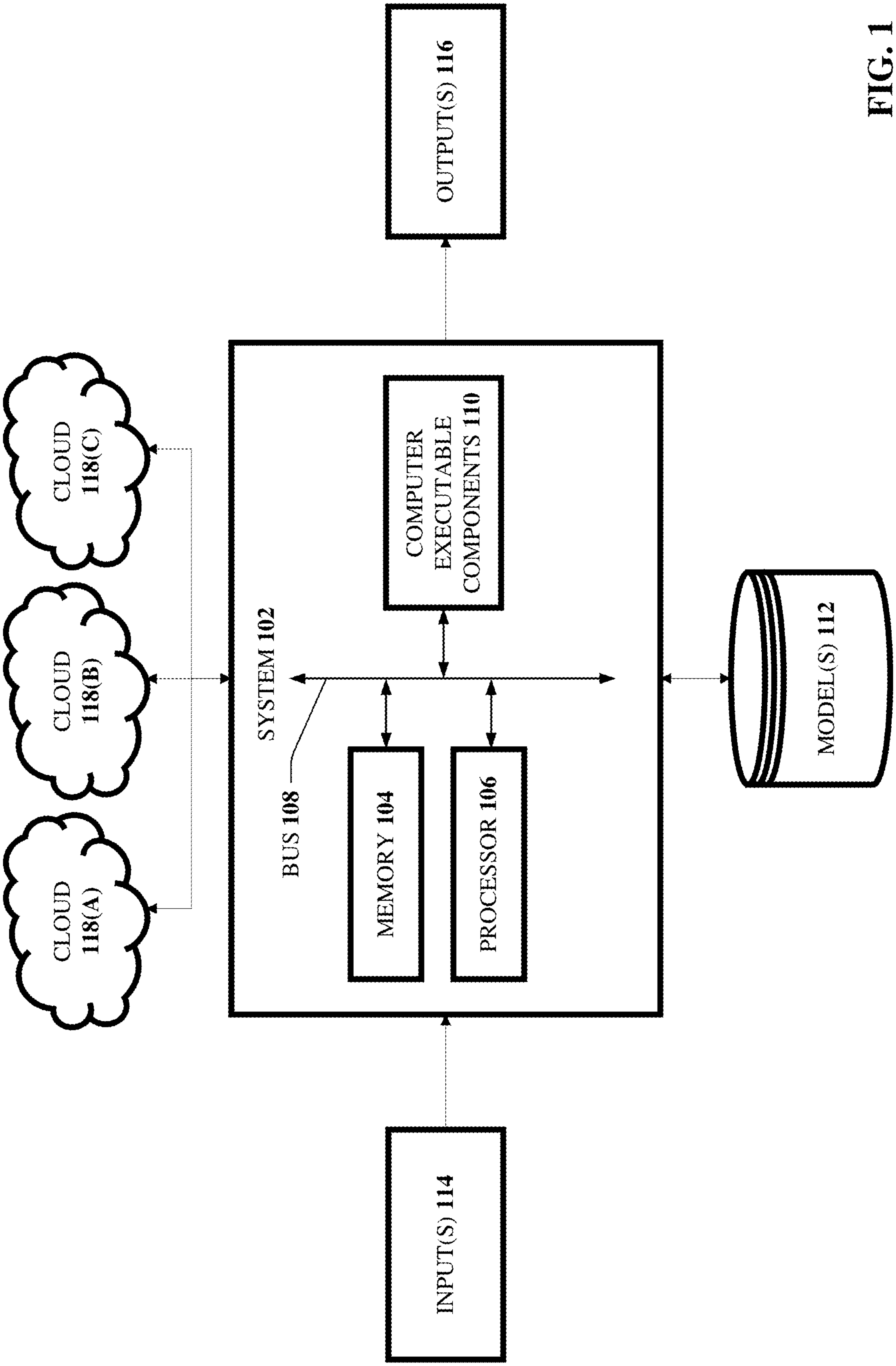
FIG. 1 is a block diagram of an example system in accordance with one or more example embodiments described herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As alluded to above, autonomous metadata harmonization in multi-cloud environments (e.g., via a computerized tool) can be improved in various ways, and various embodiments are described herein to this end and/or other ends.

According to an example embodiment, a system can comprise at least one processor, and at least one memory that stores executable instructions that, when executed by the at least one processor, facilitate performance of operations, comprising validating, using a local artificial intelligence model that was trained using federated learning applied to a group of zones of a multi-cloud architecture, a metadata attribute in a zone of the group of zones of the multi-cloud architecture, in response to determining a deviation in the metadata attribute, determining a trust score, applicable to the metadata attribute, using a defined probabilistic model, in response to the trust score being determined to satisfy a defined trust threshold, queuing a metadata update applicable to the metadata attribute, using a defined weighted priority process, determining a priority order for the metadata update among a group of metadata updates applicable to the group of zones of the multi-cloud architecture, and based on the priority order, initiating the metadata update.

In one or more example embodiments, the validating of the metadata attribute can comprise comparing real-time telemetry data, applicable to the metadata attribute, with a corresponding expected value.

In one or more example embodiments, the metadata attribute can comprise at least one of: a central processing unit usage, a memory usage, a service level agreement breach risk, a backup versioning, or a system topology.

In one or more example embodiments, the defined probabilistic model can comprise a Bayesian inference model.

In one or more example embodiments, the above operations can further comprise, in response to determining a deviation in the metadata attribute, correcting local metadata in the zone of the multi-cloud architecture.

In one or more example embodiments, the defined weighted priority process can be based on a latency sensitivity applicable to the metadata attribute or a workload criticality applicable to the metadata attribute.

In one or more example embodiments, the above operations can further comprise, during the metadata update applicable to the group of zones of the multi-cloud architecture, inserting an additional field, applicable to the zone of the multi-cloud architecture, in corresponding metadata. In this regard, the additional field can comprise a version-tagged field.

In one or more example embodiments, the above operations can further comprise, in response to initiating the metadata update applicable to the group of zones of the multi-cloud architecture, updating a global artificial intelligence model trained using the federated learning applied to the group of zones of the multi-cloud architecture. In this regard, the local artificial intelligence model can be generated based on the global artificial intelligence model. Additionally, or alternatively, the global artificial intelligence model can be updated using federated averaging applied to a group of local artificial intelligence models comprising the local artificial intelligence model.

In one or more example embodiments, the multi-cloud architecture can comprise at least one of a public cloud, a private cloud, a hybrid cloud, or an edge cloud.

In another example embodiment, a non-transitory machine-readable medium can comprise executable instructions that, when executed by at least one processor, facilitate performance of operations, comprising determining, using a local artificial intelligence model trained using federated learning applied to a group of clouds of a multi-cloud architecture, deviated metadata in a cloud of the group of clouds of the multi-cloud architecture, in response to determining the deviated metadata, determining a trust score, applicable to the deviated metadata, using a defined probabilistic model, in response to the trust score being determined to satisfy a defined trust threshold, queuing a first metadata update applicable to the deviated metadata, using a defined weighted priority process, determining a priority order for a group of metadata updates applicable to the group of clouds of the multi-cloud architecture, and based on the priority order, initiating a second metadata update applicable to the group of clouds of the multi-cloud architecture.

In one or more example embodiments, the deviated metadata can comprise a central processing unit allocation, applicable to the cloud, that deviates from a reported central processing unit allocation.

In one or more example embodiments, the above operations can further comprise generating an output applicable to the priority order for the second metadata update applicable to the group of clouds of the multi-cloud architecture. In this regard, the output can comprise a graphical user interface indicative of the priority order for the second metadata update applicable to the group of clouds of the multi-cloud architecture.

In yet another example embodiment, a method can comprise validating, by a system comprising at least one processor using a local artificial intelligence model trained using federated learning applied to a group of zones of a multi-cloud architecture, a metadata attribute in a zone of the group of zones of the multi-cloud architecture, in response to determining a deviation in the metadata attribute, determining, by the system, a trust score, applicable to the metadata attribute, using a defined probabilistic model, in response to the trust score being determined to satisfy a defined trust threshold, queuing, by the system, a metadata update applicable to the metadata attribute, using a defined weighted priority process, determining, by the system, a priority order for the metadata update among a group of metadata updates applicable to the group of zones of the multi-cloud architecture, and based on the priority order, initiating, by the system, the metadata update, applicable to the group of zones of the multi-cloud architecture.

In one or more example embodiments, the metadata attribute can be determined to be impacted by at least one of a burst input-output event, a backup failure, or metadata drift.

In one or more example embodiments, the validating the metadata attribute can comprise comparing real-time telemetry data, applicable to the metadata attribute, with corresponding expected values.

In one or more example embodiments, the metadata attribute can comprise at least one of: a central processing unit usage, a memory usage, a service level agreement breach risk, a backup versioning, or a system topology.

Metadata inconsistency is a major bottleneck to ensuring smooth and timely workload orchestration. Because conventional orchestration engines rely on current metadata to make real-time decisions regarding resource allocation, policy enforcement, and scaling actions, even minor inconsistencies can trigger incorrect prioritization of workloads. For instance, a compute-intensive job may be throttled due to outdated central processing unit (CPU) usage metadata, while other zones with idle capacity remain underutilized. This can lead to service degradation, missed service level agreements (SLAs), and inefficient infrastructure usage across the cloud ecosystem.

Moreover, artificial intelligence (AI)-based optimization engines, which are increasingly deployed to automate resource decisions, are highly sensitive to the quality of metadata they ingest. When metadata is fragmented or outdated, these AI agents make suboptimal decisions based on incomplete context, ultimately reducing their effectiveness. The inability to maintain a real-time, unified metadata layer across zones hinders the shift toward autonomous cloud operations, making it difficult to respond to workload spikes or perform coordinated scaling across vendors and platforms.

In this regard, consider the following example. In a multi-cloud backup and disaster recovery architecture, critical enterprise data is replicated across Cloud A (primary), Cloud B (replica), and Cloud C (archival). During a major outage in Cloud A, caused by a hardware failure or cyberattack, a corresponding system initiates an automated failover. The orchestrator (of the corresponding system) must select the most recent and valid backup copy from the available clouds. However, due to outdated or unsynchronized metadata, the system incorrectly identifies Cloud B as having the latest recovery point, based on stale entries that were not updated in response to the last incremental backup. In reality, Cloud B's snapshot is incomplete and corrupted, while Cloud C contains the valid copy. This misinformed decision (by the system) causes the system to attempt recovery from an invalid source, leading to extended downtime, data inconsistency, and possible compliance violations for regulated workloads. The root of the issue lies in inconsistent metadata propagation across cloud zones, in which backup timestamps, data validation status, and replication success metrics were not accurately synchronized, ultimately compromising data recovery accuracy and speed (e.g., during a critical event).

Current metadata management solutions in multi-cloud systems rely on static configuration files, centralized repositories, or slow manual reconciliation workflows. These conventional approaches are often built into system orchestrators, such as Kubernetes or Terraform, but assume relatively stable infrastructure. Such conventional solutions fail in high-churn or burst scenarios and lack support for real-time metadata correction. Metadata drift between cloud zones causes blind spots during resource provisioning, policy enforcement, or scaling. Automation models, based on static rules or outdated AI logic, further hinder agility in highly dynamic multi-cloud architectures.

To address these and other technical problems, example embodiments herein enable technical solutions to such technical problems, such as a self-reconciling metadata intelligence framework for multi-cloud environments, in which metadata is fragmented across disaggregated nodes spanning public, private, and edge clouds. In such settings, inconsistent or outdated metadata related to resource states, deployment configurations, or workload health severely impairs orchestration and automation. Example embodiments enabled herein address this, for instance, by embedding cognitive AI nodes or agents (e.g., of a system herein) across zones that can continuously monitor and validate local metadata, flagging discrepancies through trust scores and initiating autonomous correction workflows. These AI nodes (e.g., of a system herein) can interact with a central metadata controller (e.g., a system herein) that functions, for instance, as a distributed coordination plane, aggregating insights from various zones and resolving conflicts using latency and criticality-aware prioritization. Example embodiments herein can utilize defined consensus processes to ensure, for instance, that updated metadata is reliably propagated across all relevant nodes (e.g., in a multi-cloud architecture). In parallel, a dynamic metadata framework enables schemas to evolve during live operations, enabling seamless addition or modification of metadata fields based on workload type or system state, without disrupting services. All metadata decisions can be further reinforced (e.g., via a system herein) through a distributed inference layer, in which AI nodes share their learnings using federated averaging.

Example embodiments herein enable a cognitive AI layer that operates alongside a self-reconciling metadata framework, dynamically resolving inconsistencies across disaggregated multi-cloud environments. This enables, for instance, real-time, latency-aware coordination through distributed inference and metacognitive feedback loops across cloud, edge, and/or hybrid zones. Example embodiments herein ensure consistent, accurate, and up-to-date metadata across distributed multi-cloud environments, minimizing the risk of incorrect orchestration decisions during critical events like failover or scaling. Example embodiments herein further enable autonomous detection and resolution of metadata drift.

Turning now to FIG. 1, there is illustrated an example, non-limiting system 102 in accordance with one or more example embodiments herein. System 102 can comprise a computerized tool, which can be configured to perform various operations relating to autonomous metadata harmonization in multi-cloud environments. The system 102 can comprise one or more of a variety of components or elements, such as memory 104, processor 106, bus 108, and/or computer executable components 110. The system 102 can additionally comprise and/or be communicatively coupled to one or more model(s) 112, input(s) 114, output(s) 116, and/or cloud(s) 118. In various embodiments, one or more of the memory 104, processor 106, bus 108, computer executable components 110, model(s) 112, input(s) 114, output(s) 116, and/or cloud(s) 118 can be communicatively or operably coupled (e.g., over a bus or wireless network) to one another to perform one or more functions of the system 102.

Figure 2:
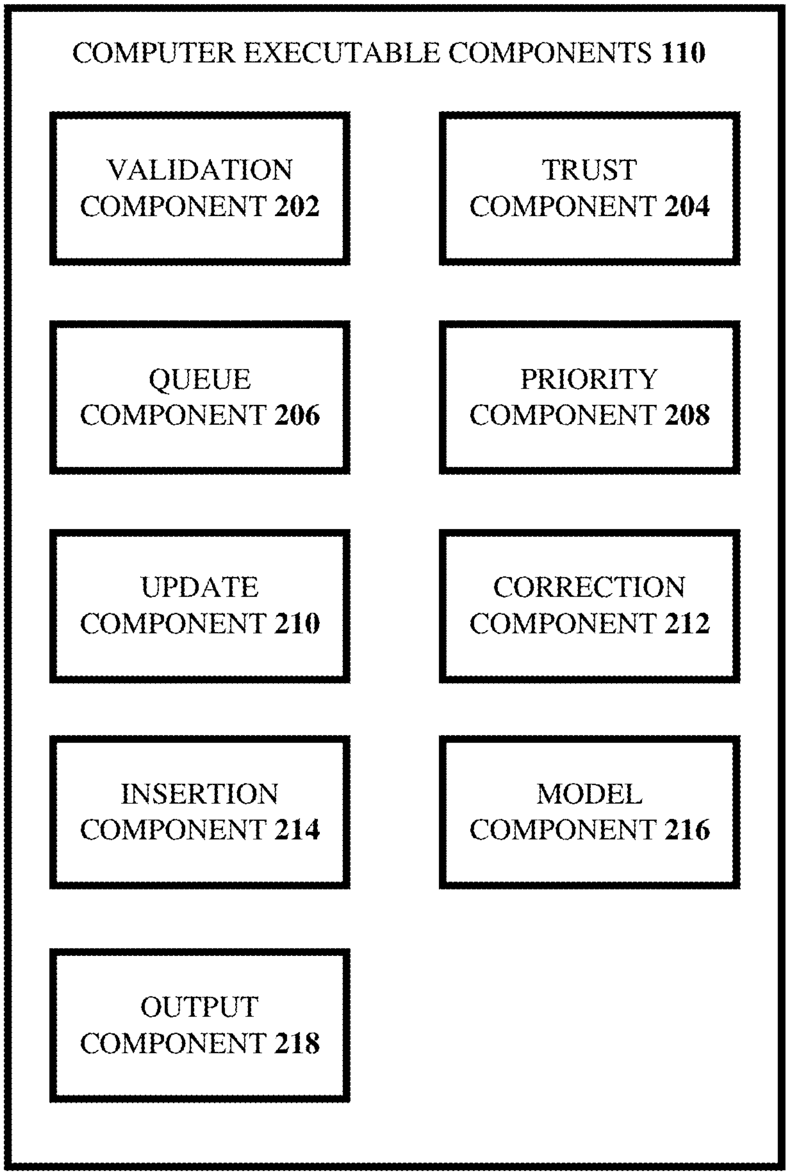
FIG. 2 is a block diagram of example computer executable components in accordance with one or more example embodiments described herein.

FIG. 2 illustrates a block diagram of example, non-limiting computer executable components 110 that can facilitate autonomous metadata harmonization in multi-cloud environments in accordance with one or more embodiments described herein. Repetitive description of like elements employed in other embodiments described herein is omitted for sake of brevity. As shown in FIG. 2, the one or more computer executable components 110 can comprise validation component 202, trust component 204, queue component 206, priority component 208, update component 210, correction component 212, insertion component 214, model component 216, and/or output component 218.

According to an example embodiment, the validation component 202 can validate, using a local artificial intelligence model (e.g., of the model(s) 112) that was trained using federated learning applied to a group of zones of a multi-cloud architecture, a metadata attribute (e.g., a deviated metadata attribute) in a zone (e.g., an individual cloud, a portion of an individual cloud, and/or an aggregate of one or more individual clouds or cloud portions) of the group of zones of the multi-cloud architecture (e.g., clouds 118 comprising cloud 118(A), cloud 118(B), and cloud 118(C)). In one or more example embodiments, the validating (e.g., via the validation component 202) of the metadata attribute can comprise comparing (e.g., via the validation component 202) real-time telemetry data, applicable to the metadata attribute, with corresponding expected value(s). Such expected values can, for instance, be predefined, can be based on historical data, and/or can be determined using machine learning (e.g., via the system 102) herein.

In one or more example embodiments, the above-described metadata attribute can comprise at least one of: a central processing unit usage, a memory usage, a service level agreement breach risk, a backup versioning, or a system topology. In one or more example embodiments, the deviated metadata can comprise a central processing unit allocation, applicable to the cloud, that deviates from a reported central processing unit allocation. In one or more example embodiments, the above-described metadata attribute can be determined (e.g., via the system 102) to be impacted by at least one of a burst input-output event, a backup failure, or metadata drift (e.g., applicable to the multi-cloud architecture).

According to an example embodiment, the trust component 204 can, in response to determining (e.g., via the validation component 202) a deviation in the metadata attribute, determine a trust score, applicable to the metadata attribute, using a defined probabilistic model (e.g., of the model(s) 112). In one or more example embodiments, the defined probabilistic model can comprise a defined Bayesian inference model. In various example embodiments, the trust score can be representative of the trustworthiness of the corresponding metadata-whether the metadata comprises threshold accuracy and/or precision.

According to an example embodiment, the queue component 206 can, in response to the trust score being determined to satisfy a defined trust threshold, queue a metadata update applicable to the metadata attribute. In this regard, the queue component 206 can add the above-described metadata update to a metadata update queue. Such a metadata update queue can comprise, for instance, a group of metadata updates, comprising the above metadata update. According to an example embodiment, the priority component 208 can, using a defined weighted priority process, determine a priority order for the metadata update among the above-described group of metadata updates applicable to the group of zones of the multi-cloud architecture. In one or more example embodiments, the defined weighted priority process can be based on a latency sensitivity applicable to the metadata attribute (and/or the group of metadata updates) or a workload criticality applicable to the metadata attribute (and/or the group of metadata updates).

According to an example embodiment, the update component 210 can, based on the priority order, initiate the metadata update. In further embodiments, based on the priority order, initiate a second metadata update applicable to the group of clouds of the multi-cloud architecture. In this regard, the update component 210 can initiate metadata updates herein sequentially based on, for instance, the priority order determined via the priority component 208.

According to an example embodiment, the correction component 212 can, in response to determining a deviation in the metadata attribute, correct local metadata in a zone of the multi-cloud architecture. For example, if the correction component 212 determines an outlier metadata attribute (e.g., value), the correction component can, for instance, replace the outlier with an updated value, an expected value, a zero value, or another suitable value. In some embodiments, the correction component 212 can determine a replacement metadata attribute (e.g., value) using machine learning trained on past metadata attributes and corresponding values, other than the metadata attribute and its corresponding value.

According to an example embodiment, the insertion component 214 can, during the metadata update applicable to the group of zones of the multi-cloud architecture, insert an additional field, applicable to the zone of the multi-cloud architecture, in corresponding metadata. The foregoing supports metadata agility during workload provisioning, failover, or emergency scaling. In this regard, the additional field can comprise a version-tagged field. This dynamic behavior ensures, for instance, that new metadata fields (e.g., for a new backup class or compliance tag) are immediately available to orchestrators and/or AI agents (e.g., enabled via the system 102) without breaking compatibility with existing entries.

According to an example embodiment, the model component 216 can, in response to initiating the metadata update applicable to the group of zones of the multi-cloud architecture, update a global artificial intelligence model (e.g., of the model(s) 112) trained using the federated learning applied to the group of zones of the multi-cloud architecture (e.g., clouds 118). In this regard, the local artificial intelligence model (e.g., of the model(s) 112) can be generated (e.g., via the model component 216) based on the global artificial intelligence model (e.g., of the model(s) 112). Additionally, or alternatively, the global artificial intelligence model can be updated (e.g., via the model component 216) using federated averaging applied to a group of local artificial intelligence models (e.g., of the model(s) 112) comprising the local artificial intelligence model (e.g., of the model(s) 112).

According to an example embodiment, the output component 218 can generate an output applicable to the priority order for the second metadata update (and/or the first metadata update) applicable to the group of clouds of the multi-cloud architecture. In this regard, the output can comprise a graphical user interface (GUI) indicative of the priority order for the second metadata update (and/or the first metadata update) applicable to the group of clouds of the multi-cloud architecture. Additionally, or alternatively, the output can be transmitted (e.g., via the output component 218) from the system 102 to a device other than the system 102.

Various example embodiments herein can employ artificial-intelligence or machine learning systems and techniques to facilitate learning user behavior, context-based scenarios, preferences, etc. in order to facilitate taking automated action with high degrees of confidence. Utility-based analysis can be utilized to factor benefit of taking an action against cost of taking an incorrect action. Probabilistic or statistical-based analyses can be employed in connection with the foregoing and/or the following.

It is noted that systems and/or associated controllers, servers, or machine learning components herein can comprise artificial intelligence component(s) which can employ an AI model and/or ML or an ML model that can learn to perform the above or below described functions (e.g., via training using historical training data and/or feedback data).

In some embodiments, system 102 can comprise an AI and/or ML model that can be trained (e.g., via supervised and/or unsupervised techniques) to perform the above or below-described functions using historical training data comprising various context conditions that correspond to various augmented network optimization operations. In this example, such an AI and/or ML model can further learn (e.g., via supervised and/or unsupervised techniques) to perform the above or below-described functions using training data comprising feedback data, where such feedback data can be collected and/or stored (e.g., in memory) by the system 102. In this example, such feedback data can comprise the various instructions described above/below that can be input, for instance, to a system herein, over time in response to observed/stored context-based information.

The system 102 can initiate an operation(s) associated with a based on a defined level of confidence determined using information (e.g., feedback data). For example, based on learning to perform such functions described above using feedback data, performance information, and/or past performance information herein, the system 102 herein can initiate an operation associated with determining various thresholds herein (e.g., a motion pattern thresholds, input pattern thresholds, similarity thresholds, authentication signal thresholds, audio frequency thresholds, or other suitable thresholds).

In an example embodiment, the system 102 can perform a utility-based analysis that factors cost of initiating the above-described operations versus benefit. In this embodiment, the system 102 can use one or more additional context conditions to determine various thresholds herein.

To facilitate the above-described functions, the system 102 herein can perform classifications, correlations, inferences, and/or expressions associated with principles of artificial intelligence. For instance, the system 102 can employ an automatic classification system and/or an automatic classification. In one example, the system 102 can employ a probabilistic and/or statistical-based analysis (e.g., factoring into the analysis utilities and costs) to learn and/or generate inferences. The system 102 can employ any suitable machine-learning based techniques, statistical-based techniques, and/or probabilistic-based techniques. For example, the system 102 can employ expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or the like. In another example, the system 102 can perform a set of machine-learning computations. For instance, the system 102 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

FIG. 3 shows an example table 300 associated with metadata drift detection (e.g., via the system 102) in accordance with one or more example embodiments described herein. As discussed herein, embodiments herein enable decentralized cognitive AI nodes or agents (e.g., via the system 102) which can be deployed across multiple cloud zones (e.g., clouds 118), in which the nodes can be utilized (e.g., via the system 102) to continuously monitor metadata attributes such as CPU/memory usage, SLA breach risk, backup versioning, and/or system topology. These nodes or agents can be operated autonomously (e.g., via the system 102), comparing real-time telemetry against expected metadata values. When deviations are determined (e.g., actual CPU allocation deviating from what metadata reports), the nodes or agents (e.g., via the system 102) can determine a trust score using one or more probabilistic models, such as Bayesian inference, and then determine whether to trigger a local metadata correction or to escalate. Example deviations and actions are depicted in table 300. The trust score can be determined (e.g., via the trust component 204), for instance, using the following Bayesian logic:

$$P(\theta|D) \propto P(D|\theta) \times P(\theta) \quad \text{(Equation 1)}$$

in which θ represents trustworthiness of metadata, D represents observed data (e.g., CPU logs, latency reports), P(D|θ) represents likelihood of observing the data given metadata state, and P(θ) represents prior determination (e.g., understanding) of metadata validity.

Example embodiments herein enable (e.g., via the system 102) a coordination layer responsible for resolving metadata inconsistencies across cloud zones. Example embodiments herein can utilize a distributed consensus process (e.g., Raft or Paxos) to determine (e.g., via the system 102) a consistent, agreed-upon state of metadata during high-churn events, such as workload migration or autoscaling. The system 102 can receive anomaly alerts or trust scores, for instance, via cognitive nodes agents, and prioritize updates, for instance, based on latency sensitivity and workload criticality using a defined weighted priority function:

$$\text{Priority Score} = \alpha \times \text{Latency\_Weight} + \beta \times \text{Criticality\_Weight} \quad \text{(Equation 2)}$$

in which (α, β are tunable based on defined system goals).

Example embodiments herein can prevent (e.g., via the system 102) conflicting updates, for instance, by executing negotiation-based workflows and ensuring that every zone receives a synchronized metadata state. Example embodiments herein eliminate the need for manual intervention or sequential polling, for instance, by enabling (e.g., via the system 102) real-time propagation through intelligent broadcasting and selective update prioritization.

FIG. 4 shows an example table 400 associated with dynamic schema extension in accordance with one or more example embodiments described herein. Example embodiments herein enable, for instance, a schema-flexible, version-controlled metadata layer that can evolve, for instance, in real time as workload requirements change. Unlike rigid static models, example embodiments herein can utilize strongly typed hierarchical schemas and enable optional or version-tagged fields to be added without rebooting nodes or restarting systems. The foregoing supports metadata agility during workload provisioning, failover, or emergency scaling. A corresponding schema supports logic such as:

if (workload_type==‘emergency’)→inject keys: [priority_level, latency_sla_ms]

This dynamic behavior ensures that new metadata fields (e.g., for a new backup class or compliance tag) are immediately available (e.g., via the system 102) to corresponding orchestrators and/or AI nodes/agents without breaking compatibility with existing entries. Examples of new metadata fields are shown in table 400.

FIG. 5 shows an example table 500 associated with autonomous metadata harmonization in multi-cloud environments in accordance with one or more example embodiments described herein. Example embodiments herein enable (e.g., via the system 102) collaborative, privacy-preserving intelligence across cloud zones (e.g., clouds 118), for instance, by leveraging federated learning, enabling each zone to train local AI models on telemetry and metadata streams without transmitting sensitive raw data. These local models can be utilized (e.g., via the system 102) to identify real-time anomalies, such as burst I/O events, sudden backup failures, or metadata drift that can compromise workload orchestration. Since the corresponding training occurs locally, it preserves data locality and regulatory compliance, which can be especially important in multi-cloud environments with varying data governance requirements. The model parameters learned (e.g., via the model component 216) at each zone can be periodically transmitted (e.g., via the system 102) to central aggregation (e.g., the system 102), in which a federated averaging process can be utilized (e.g., via the system 102) to determine the global metadata inference model (e.g., of the model(s) 112). An example federated model aggregation process can comprise:

$$\text{Global Model} = (1/N) \sum \text{Local Models} \quad \text{(Equation 3)}$$

in which N represents the number of participating zones.

This global model can then be redistributed (e.g., via the model component 216) to each zone, continuously enhancing respective local decision-making capabilities based on system-wide patterns. This approach enables metadata consistency and adaptability across all zones, while avoiding the overhead and security risk of centralized raw data pooling. It further enables the system 102 to evolve in response to operational changes, workload shifts, or policy updates, making metadata-driven orchestration context-aware and self-adaptive across the cloud ecosystem. In real-world operation, an edge zone detecting frequent packet loss or repeated backup failures can update (e.g., via the system 102) its thresholds or rollback metadata to a stable version and then broadcast this change upward. This synchronization loop ensures that global metadata evolves with environmental context, reducing system-wide blind spots.

Figure 6:
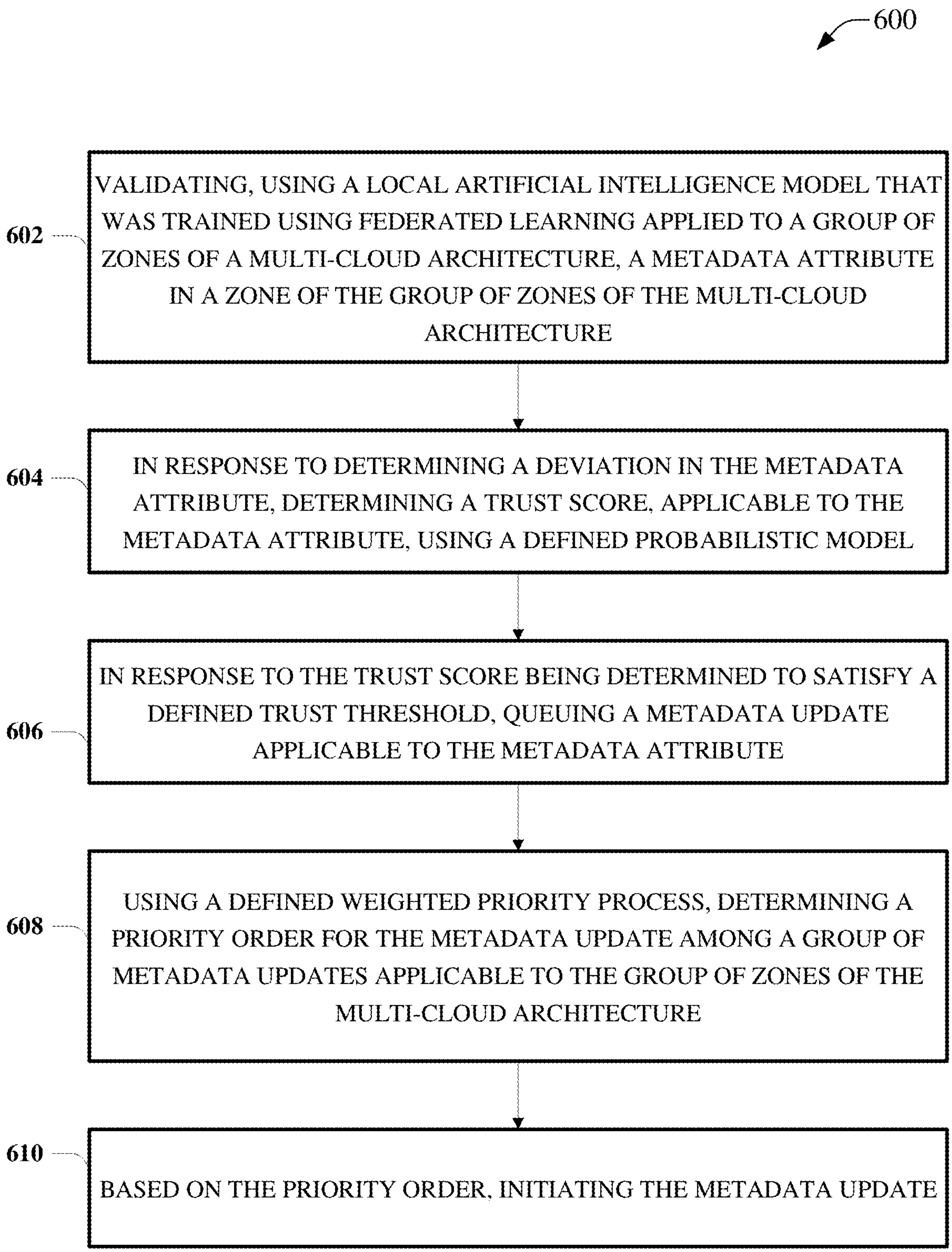
FIG. 6 is a block flow diagram for a process associated with autonomous metadata harmonization in multi-cloud environments in accordance with one or more example embodiments described herein.

FIG. 6 illustrates a block flow diagram for a process 600 associated with autonomous metadata harmonization in multi-cloud environments in accordance with one or more embodiments described herein. At 602, the process 600 can comprise validating (e.g., via the validation component 202), using a local artificial intelligence model (e.g., of the model(s) 112) that was trained using federated learning applied to a group of zones of a multi-cloud architecture (e.g., clouds 118), a metadata attribute in a zone of the group of zones of the multi-cloud architecture (e.g., clouds 118). At 604, the process 600 can comprise, in response to determining a deviation in the metadata attribute, determining (e.g., via the trust component 204) a trust score, applicable to the metadata attribute, using a defined probabilistic model (e.g., of the model(s) 112). At 606, the process 600 can comprise, in response to the trust score being determined to satisfy a defined trust threshold, queuing (e.g., via the queue component 206) a metadata update applicable to the metadata attribute. At 608, the process 600 can comprise, using a defined weighted priority process, determining (e.g., via the priority component 208) a priority order for the metadata update among a group of metadata updates applicable to the group of zones of the multi-cloud architecture (e.g., clouds 118). At 610, the process 600 can comprise, based on the priority order, initiating (e.g., via the update component 210) the metadata update.

Figure 7:
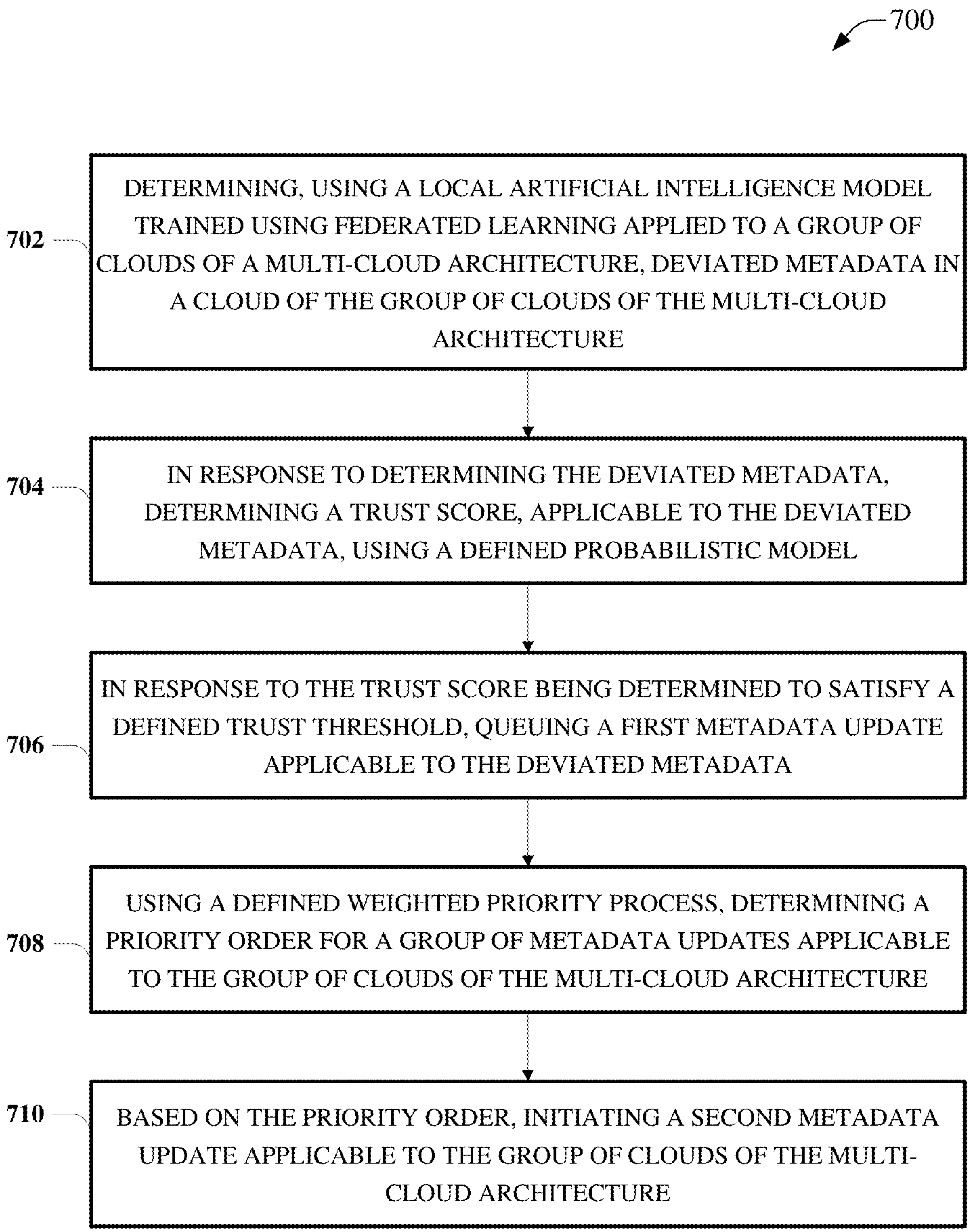
FIG. 7 is a block flow diagram for a process associated with autonomous metadata harmonization in multi-cloud environments in accordance with one or more example embodiments described herein.

FIG. 7 illustrates a block flow diagram for a process 700 associated with autonomous metadata harmonization in multi-cloud environments in accordance with one or more embodiments described herein. At 702, the process 700 can comprise determining (e.g., via the validation component 202), using a local artificial intelligence model (e.g., of the model(s) 112) trained using federated learning applied to a group of clouds of a multi-cloud architecture (e.g., clouds 118), deviated metadata in a cloud of the group of clouds of the multi-cloud architecture (e.g., clouds 118). At 704, the process 700 can comprise, in response to determining the deviated metadata, determining (e.g., via the trust component 204) a trust score, applicable to the deviated metadata, using a defined probabilistic model (e.g., of the model(s) 112). At 706, the process 700 can comprise, in response to the trust score being determined to satisfy a defined trust threshold, queuing (e.g., via the queue component 206) a first metadata update applicable to the deviated metadata. At 708, the process 700 can comprise, using a defined weighted priority process, determining (e.g., via the priority component 208) a priority order for a group of metadata updates applicable to the group of clouds of the multi-cloud architecture (e.g., clouds 118). At 710, the process 700 can comprise, based on the priority order, initiating (e.g., via the update component 210) a second metadata update applicable to the group of clouds of the multi-cloud architecture (e.g., clouds 118).

Figure 8:
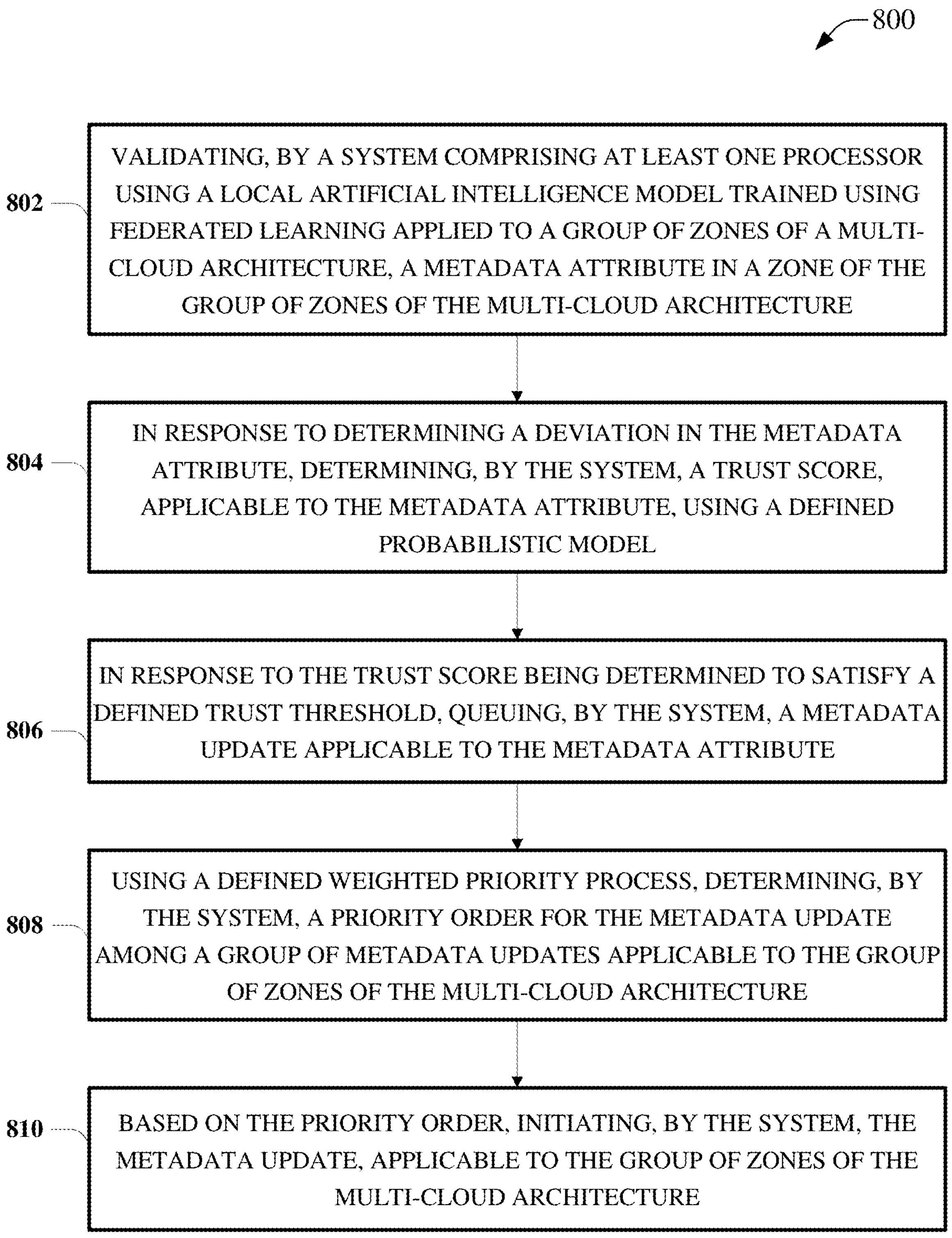
FIG. 8 is a block flow diagram for a process associated with autonomous metadata harmonization in multi-cloud environments in accordance with one or more example embodiments described herein.

FIG. 8 illustrates a block flow diagram for a process 800 associated with autonomous metadata harmonization in multi-cloud environments in accordance with one or more embodiments described herein. At 802, the process 800 can comprise validating (e.g., via the validation component 202), by a system (e.g., system 102) comprising at least one processor (e.g., processor 106) using a local artificial intelligence model (e.g., of the model(s) 112) trained using federated learning applied to a group of zones of a multi-cloud architecture (e.g., clouds 118), a metadata attribute in a zone of the group of zones of the multi-cloud architecture (e.g., clouds 118). At 804, the process 800 can comprise, in response to determining a deviation in the metadata attribute, determining (e.g., via the trust component 204), by the system, a trust score, applicable to the metadata attribute, using a defined probabilistic model (e.g., of the model(s) 112). At 806, the process 800 can comprise, in response to the trust score being determined to satisfy a defined trust threshold, queuing (e.g., via the queue component 206), by the system, a metadata update applicable to the metadata attribute. At 808, the process 800 can comprise, using a defined weighted priority process, determining (e.g., via the priority component 208), by the system, a priority order for the metadata update among a group of metadata updates applicable to the group of zones of the multi-cloud architecture (e.g., clouds 118). At 810, the process 800 can comprise, based on the priority order, initiating (e.g., via the update component 210), by the system, the metadata update, applicable to the group of zones of the multi-cloud architecture (e.g., clouds 118).

Figure 9:
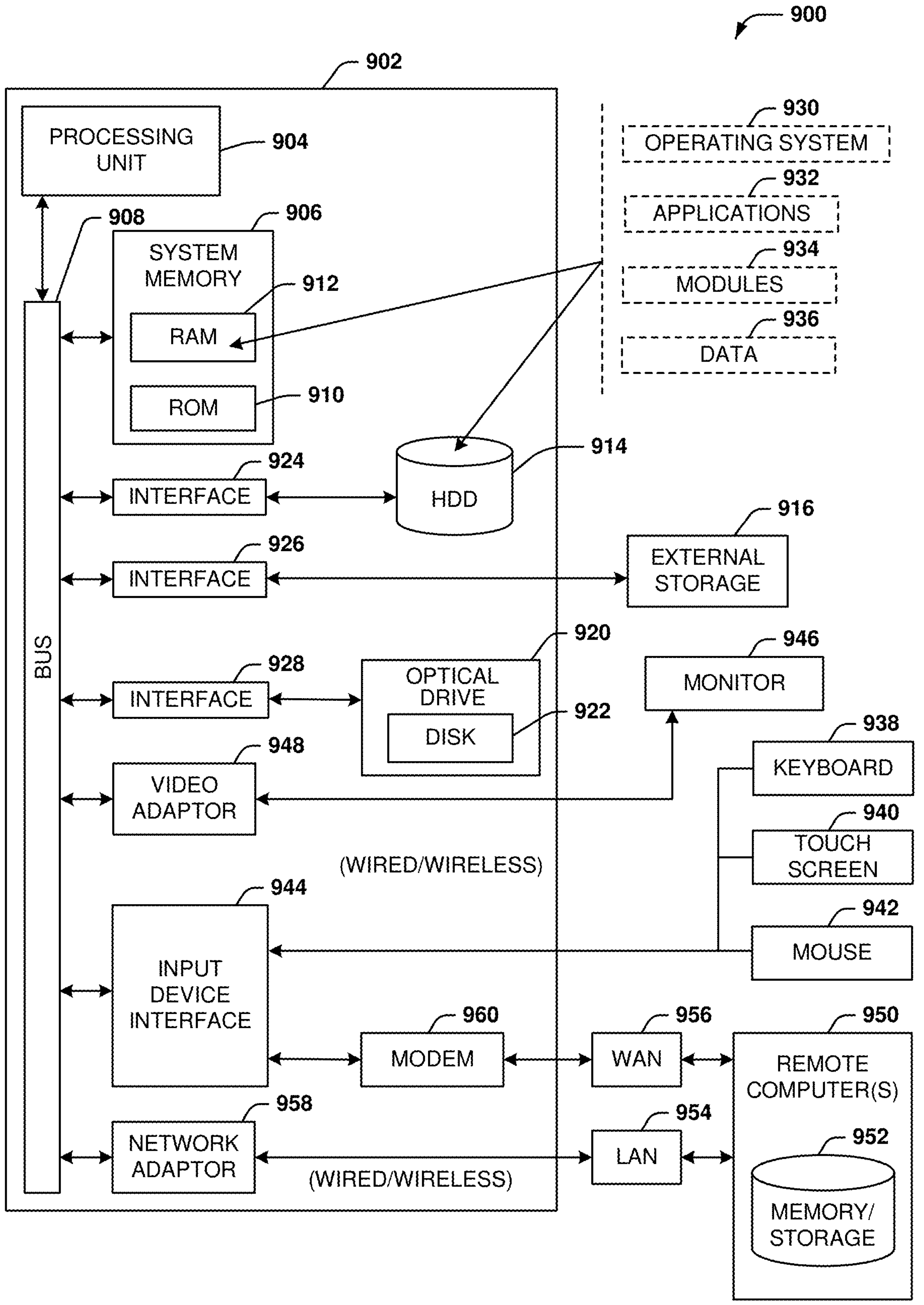
FIG. 9 is an example, non-limiting computing environment in which one or more embodiments described herein can be implemented.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IOT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and an optical disk drive 920 (e.g., which can read or write from a disk 922, such as a CD-ROM disc, a DVD, a BD, etc.). While the internal HDD 914 is illustrated as located within the computer 902, the internal HDD 914 can also be configured for external use in a suitable chassis (not shown). Additionally, while not shown in environment 900, a solid-state drive (SSD) could be used in addition to, or in place of, an HDD 914. The HDD 914, external storage device(s) 916 and optical disk drive 920 can be connected to the system bus 908 by an HDD interface 924, an external storage interface 926 and an optical drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enabled with a security module, such as a trusted processing module (TPM). For instance, with a TPM, boot components hash next in time boot components and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or another type of display device can also be connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/ wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are examples and other means of establishing a communications link between the computers can be used.

When used in either a LAN or WAN networking environment, the computer 902 can access cloud storage systems or other network-based storage systems in addition to, or in place of, external storage devices 916 as described above. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 10:
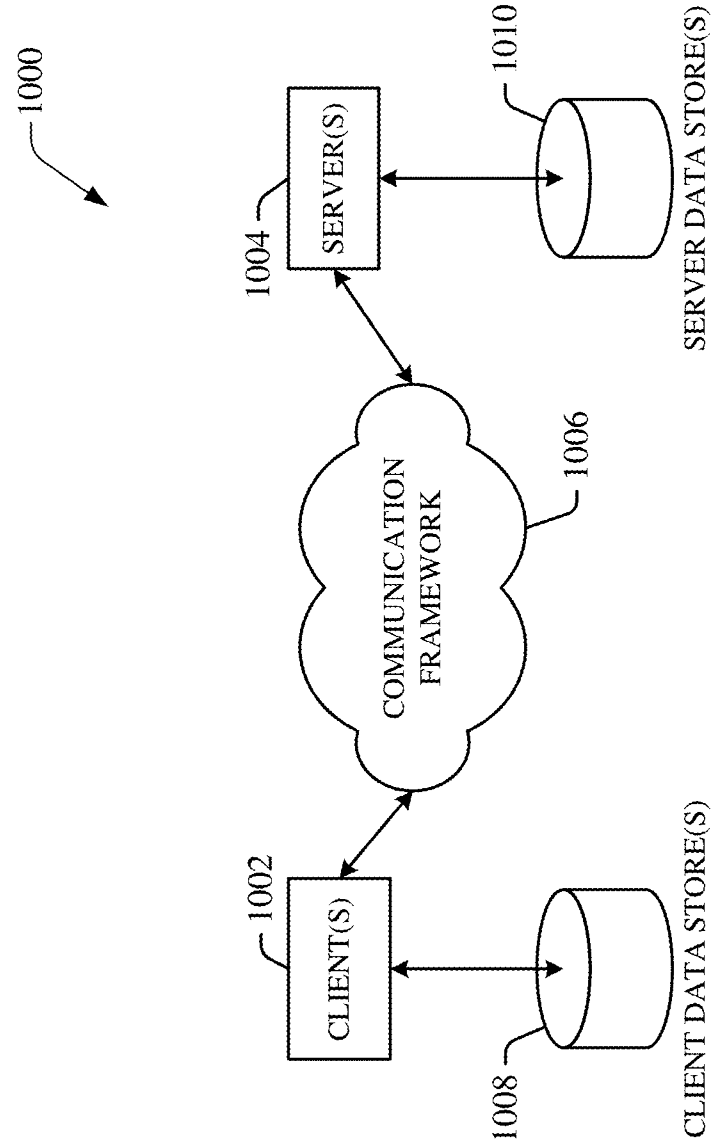
FIG. 10 is an example, non-limiting networking environment in which one or more embodiments described herein can be implemented.

Referring now to FIG. 10, there is illustrated a schematic block diagram of a computing environment 1000 in accordance with this specification. The system 1000 includes one or more client(s) 1002, (e.g., computers, smart phones, tablets, cameras, PDA's). The client(s) 1002 can be hardware and/or software (e.g., threads, processes, computing devices). The client(s) 1002 can house cookie(s) and/or associated contextual information by employing the specification, for example.

The system 1000 also includes one or more server(s) 1004. The server(s) 1004 can also be hardware or hardware in combination with software (e.g., threads, processes, computing devices). The servers 1004 can house threads to perform transformations of media items by employing aspects of this disclosure, for example. One possible communication between a client 1002 and a server 1004 can be in the form of a data packet adapted to be transmitted between two or more computer processes wherein data packets may include coded analyzed headspaces and/or input. The data packet can include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

In one exemplary implementation, a client 1002 can transfer an encoded file, (e.g., encoded media item), to server 1004. Server 1004 can store the file, decode the file, or transmit the file to another client 1002. It is noted that a client 1002 can also transfer uncompressed files to a server 1004 and server 1004 can compress the file and/or transform the file in accordance with this disclosure. Likewise, server 1004 can encode information and transmit the information via communication framework 1006 to one or more clients 1002.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein but rather should be construed in breadth and scope in accordance with the appended claims below.

What is claimed is:

1. A system, comprising:

at least one processor; and at least one memory that stores executable instructions that, when executed by the at least one processor, facilitate performance of operations, comprising:

validating, using a local artificial intelligence model that was trained using federated learning applied to a group of zones of a multi-cloud architecture, a metadata attribute in a zone of the group of zones of the multi-cloud architecture;

in response to determining a deviation in the metadata attribute, determining a trust score, applicable to the metadata attribute, using a defined probabilistic model;

in response to the trust score being determined to satisfy a defined trust threshold, queuing a metadata update applicable to the metadata attribute;

using a defined weighted priority process, determining a priority order for the metadata update among a group of metadata updates applicable to the group of zones of the multi-cloud architecture; and based on the priority order, initiating the metadata update.

2. The system of claim 1, wherein the validating of the metadata attribute comprises comparing real-time telemetry data, applicable to the metadata attribute, with a corresponding expected value.

3. The system of claim 1, wherein the metadata attribute comprises at least one of: a central processing unit usage, a memory usage, a service level agreement breach risk, a backup versioning, or a system topology.

4. The system of claim 1, wherein the defined probabilistic model comprises a Bayesian inference model.

5. The system of claim 1, wherein the operations further comprise:

in response to determining a deviation in the metadata attribute, correcting local metadata in the zone of the multi-cloud architecture.

6. The system of claim 1, wherein the defined weighted priority process is based on a latency sensitivity applicable to the metadata attribute or a workload criticality applicable to the metadata attribute.

7. The system of claim 1, wherein the operations further comprise:

during the metadata update applicable to the group of zones of the multi-cloud architecture, inserting an additional field, applicable to the zone of the multi-cloud architecture, in corresponding metadata.

8. The system of claim 7, wherein the additional field comprises a version-tagged field.

9. The system of claim 1, wherein the operations further comprise:

in response to initiating the metadata update applicable to the group of zones of the multi-cloud architecture, updating a global artificial intelligence model trained using the federated learning applied to the group of zones of the multi-cloud architecture.

10. The system of claim 9, wherein the local artificial intelligence model has been generated based on the global artificial intelligence model.

11. The system of claim 9, wherein the global artificial intelligence model is updated using federated averaging applied to a group of local artificial intelligence models comprising the local artificial intelligence model.

12. The system of claim 1, wherein the multi-cloud architecture comprises at least one of a public cloud, a private cloud, a hybrid cloud, or an edge cloud.

13. A non-transitory machine-readable medium, comprising executable instructions that, when executed by at least one processor, facilitate performance of operations, comprising:

determining, using a local artificial intelligence model trained using federated learning applied to a group of clouds of a multi-cloud architecture, deviated metadata in a cloud of the group of clouds of the multi-cloud architecture;

in response to determining the deviated metadata, determining a trust score, applicable to the deviated metadata, using a defined probabilistic model;

in response to the trust score being determined to satisfy a defined trust threshold, queuing a first metadata update applicable to the deviated metadata;

using a defined weighted priority process, determining a priority order for a group of metadata updates applicable to the group of clouds of the multi-cloud architecture; and based on the priority order, initiating a second metadata update applicable to the group of clouds of the multi-cloud architecture.

14. The non-transitory machine-readable medium of claim 13, wherein the deviated metadata comprises a central processing unit allocation, applicable to the cloud, that deviates from a reported central processing unit allocation.

15. The non-transitory machine-readable medium of claim 13, wherein the operations further comprise:

generating an output applicable to the priority order for the second metadata update applicable to the group of clouds of the multi-cloud architecture.

16. The non-transitory machine-readable medium of claim 15, wherein the output comprises a graphical user interface indicative of the priority order for the second metadata update applicable to the group of clouds of the multi-cloud architecture.

17. A method, comprising:

validating, by a system comprising at least one processor using a local artificial intelligence model trained using federated learning applied to a group of zones of a multi-cloud architecture, a metadata attribute in a zone of the group of zones of the multi-cloud architecture;

in response to determining a deviation in the metadata attribute, determining, by the system, a trust score, applicable to the metadata attribute, using a defined probabilistic model;

in response to the trust score being determined to satisfy a defined trust threshold, queuing, by the system, a metadata update applicable to the metadata attribute;

using a defined weighted priority process, determining, by the system, a priority order for the metadata update among a group of metadata updates applicable to the group of zones of the multi-cloud architecture; and based on the priority order, initiating, by the system, the metadata update, applicable to the group of zones of the multi-cloud architecture.

18. The method of claim 17, wherein the metadata attribute has been determined to be impacted by at least one of a burst input-output event, a backup failure, or metadata drift.

19. The method of claim 17, wherein the validating the metadata attribute comprises comparing real-time telemetry data, applicable to the metadata attribute, with corresponding expected values.

20. The method of claim 17, wherein the metadata attribute comprises at least one of: a central processing unit usage, a memory usage, a service level agreement breach risk, a backup versioning, or a system topology.

* * * * *